United States Patent [19]

Casey

[11] 4,181,972
[45] Jan. 1, 1980

[54] MEANS AND METHODS FOR AUTOMATIC HYPHENATING WORDS

[75] Inventor: John L. Casey, Santa Barbara, Calif.

[73] Assignee: Burroughs Corporation, Detroit, Mich.

[21] Appl. No.: 702,676

[22] Filed: Jul. 6, 1976

Related U.S. Application Data

[63] Continuation-in-part of Ser. No. 682,769, May 3, 1976, abandoned.

[51] Int. Cl.² ............................................. g06F 7/20
[52] U.S. Cl. ................................. 364/900; 364/300
[58] Field of Search ................. 197/19, 20, 84 A; 364/200 MS File, 900 MS File, 200, 900, 300; 400/7

[56] References Cited

U.S. PATENT DOCUMENTS

| | | | |
|---|---|---|---|
| 3,307,154 | 2/1967 | Garth et al. | 364/900 |
| 3,439,341 | 4/1969 | Doley et al. | 364/900 |
| 3,529,296 | 9/1970 | Friedman et al. | 364/900 |
| 3,537,076 | 10/1970 | Damerau | 364/900 |
| 3,991,405 | 11/1976 | Boyd et al. | 364/900 |
| 4,028,677 | 6/1977 | Rosenbaum | 364/900 |

Primary Examiner—Mark E. Nusbaum
Attorney, Agent, or Firm—Nathan Cass; Kevin R. Peterson; Edward J. Feeney, Jr.

[57] ABSTRACT

Automatic means and methods for hyphenating words suitable for use with digitally controlled printing apparatus wherein the consonant-vowel pattern of a predetermined selected portion of a word is converted to binary digital values and compared to a compact table of consonant-vowel pattern values. Certain exception conditions may be separately handled to increase accuracy.

9 Claims, 5 Drawing Figures

BURROUGHS

|⎯⎯⎯⎯| – SPACES LEFT
⎣⎯⎯⎯⎦ – LETTER EXAMINED
1 1 0 0 1 – HYPHENATION TABLE
– – DEFAULT HYPHEN POINT
BUR- – HYPHENATION

| | |
|---|---|
| 0 | 00000x |
| 1 | 0000-1 |
| 2 | 000-10 |
| 3 | 0001-1 |
| 4 | 00-100 |
| 5 | 00-101 |
| 6 | 001-10 |
| 7 | 001-11 |
| 8 | 0-1000 |
| 9 | 0-1001 |
| 10 | 010-10 |
| 11 | 0101-1 |
| 12 | 01-100 |
| 13 | 01-101 |
| 14 | 01-110 |
| 15 | 01-111 |
| 16 | 100-00 |
| 17 | 1000-1 |
| 18 | 100-10 |
| 19 | 1001-1 |
| 20 | 10-100 |
| 21 | 10-101 |
| 22 | 101-10 |
| 23 | 101-11 |
| 24 | 1100-0 |
| 25 | 1-1001 |
| 26 | 110-10 |
| 27 | 1-1011 |
| 28 | 1-1100 |
| 29 | 1-1101 |
| 30 | 1-1110 |
| 31 | 11111x |

NOTE: "x" INDICATES THAT HYPHENATION IS NOT PERFORMED

MEANS AND METHODS FOR AUTOMATIC HYPHENATING WORDS

This invention is a continuation-in-part of U.S. patent application Ser. No. 682,769, filed May 3, 1976, now abandoned.

BACKGROUND OF THE INVENTION

This invention relates generally to the formatting of data as it is printed or written on a printing or other display medium. More particularly, the invention relates to automatic means and methods for hyphenating a word at the end of a particular line of print. The invention has proven suitable for automatic implementation in conjunction with a data processing system printer.

Properly hyphenating words at an appropriate break point has proven to be a difficult problem in computer print-out formatting. In the past, several approaches have been used, each with attendant disadvantages.

One approach has been to employ a huge word dictionary stored in memory containing as many words as possible along with their respective break points. Such a dictionary involves relatively large amounts of memory and entails the possibility that some words may be omitted from the dictionary.

A second known approach employs a cathode ray tube to display the print-out. This method requires that an operator be present to determine the proper hyphenation point in 100% of the cases.

Pre-hyphenation approaches have also been utilized in the prior art. In such approaches, words to be hyphenated must be anticipated and entered by the user. Again, undesirable human intervention is involved.

Other known approaches involve the use of so-called logical hyphenation approaches which determine hyphenation break points based on the logical detection of particular prefixes, suffixes, syllables and/or other predetermined letter patterns, the hyphenation break point being determined by predetermined logical manipulation of the logically detected data based on, for example, the word division rules of Webster's New International Dictionary. Known logical hyphenation approaches of this type involve relatively complex data processing operations. Furthermore, because of the often illogical linguistic or etymological bases of these hyphenation rules, such logical hyphenation approaches do not hyphenate all words properly. Thus, it is usually necessary to additionally provide an exception table for hyphenation situations which do not fit the logical hyphenation rules provided. Known prior art combinations of a logical hyphenation approach with an exception table have been found to be uneconomical and unduly complex for use in applications where low cost or limited memory are important factors.

SUMMARY OF THE INVENTION

It is therefore a broad object of the invention to provide improved and more economical means and methods for automatically determining the hyphenation break point of words for use by a printer or other display device.

It is a more specific object of the invention to provide improved means and methods for automatic word hyphenation using a logical hyphenation approach which can be implemented in an economical and relatively simple manner.

A further object of the invention in accordance with the foregoing objects is to provide for the combination of the logical hyphenation approach of the invention with an exception table to increase accuracy.

These and other objects and advantages of the invention are accomplished in a preferred embodiment by employing a logical hyphenation approach in which logical hyphenation data is primarily derived based on the consonant-vowel pattern of a particular predetermined portion of the word to be hyphenated. It has been found that such a logical hyphenation approach permits an unexpectedly compact table of values of possible consonant-vowel combinations to be provided for comparison with the detected predetermined consonant-vowel pattern in a word to be hyphenated, whereby acceptable hyphenation can readily be provided in an unexpectedly large number of hyphenation situations. This logical hyphenation approach of the invention is further enhanced in the preferred embodiment described herein by employing an exception table in combination therewith which can also be economically provided because of the relatively few exception situations that need to be handled in view of the advantageous consonant-vowel logical hyphenation approach employed therewith.

DETAILED DESCRIPTION

In order to permit the detailed description of the invention to be more readily understood, an overview of the operations occuring with respect to a particular illustrative example will first be briefly presented.

Figures 1, 2, 3:
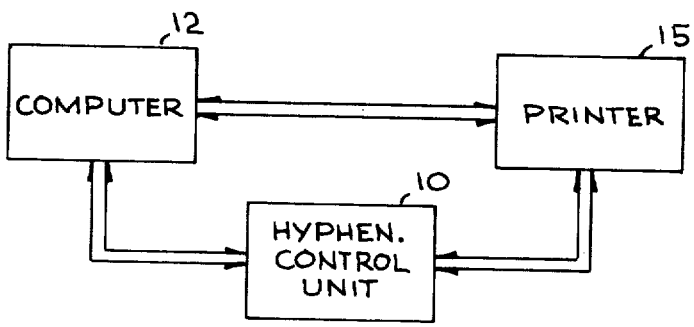
FIG. 1 illustrates an example of the manner in which a typical word is hyphenated in accordance with a preferred embodiment of the invention.
FIG. 2 illustrates the hyphenation table utilized in the preferred embodiment of the invention.
FIG. 3 generally illustrates how the invention may be incorporated in a conventional data processing system using a separately provided hyphenation control unit.

Referring to FIG. 1, a typical word such as the word "BURROUGHS" is examined to determine if its length is greater than the number of spaces remaining on a particular line taking into account the need to provide a space for the hyphen at the end of the line. If so, the word is then examined to determine if its length is greater than a predetermined value, such as, for example, eight. If these tests are satisfied, the letters of the word involved are digitized to the bit values 0 or 1 as follows:

Vowel: 0
Consonant: 1

Next, the C-V bit values of the last five letters which would fit on the line are then chosen for comparison to the C-V hyphenation table in FIG. 2, and the hyphen is placed as indicated in the table. In the table of FIG. 2 "-" indicates where the hyphen will occur.

For example, in FIG. 1, if the nine letter word "BURROUGHS" is to be printed and only six spaces are left at the end of the line, the fifth letter "G" is the last one which will fit on the end of the line, since the sixth and remaining space must be left for the hyphen symbol "-". Thus, the five letter pattern to be examined comprises the letters "RROUG" which when digitized on a consonant-vowel basis converts to the binary digits 11001. This C-V digit pattern corresponds to that recorded at position 25 in the hyphenation table of FIG. 2 and the word is thus hyphenated after the first consonant in the pattern examined, as indicated in the table. Thus, the letters "BUR" would be printed on the current line followed by a hyphen "-", and the remaining letters "ROUGHS" would be printed on the next line.

The C-V table in FIG. 2 will now be considered in more detail. Experience has shown that it is preferable to employ the last five letters that will fit on a line in order to provide acceptable hyphenation using a consonant-vowel logical hyphenation approach in accordance with the invention. It will be understood that the choice of five letters results in a consonant-vowel table, such as illustrated in FIG. 2, containing the 32 possible bit value patterns which can occur for five letters. A greater number of letters of each word to be hyphenated could, of course, also be chosen, in which case, a correspondingly larger table would be required. For example, six letters would require a table having sixty-four possible bit value patterns. The choice of the particular group and number of letters to be examined in a consonant-vowel approach in accordance with the invention will depend on the particular needs of each application.

Having provided an appropriate C-V bit value table, such as illustrated in FIG. 2, it then becomes necessary to determine where to locate the hyphen break point for each pattern. It is significant to note that the designer may make any desired choice for each bit pattern based on experience or any other basis that may be best for a particular application. In other words, an important advantage of the present invention is that the designer is free to make any desired choice of hyphenation location for each pattern of the C-V table without penalty of increased complexity, since detection of the table position for which a match is achieved with respect to the examined C-V pattern of the word to be hyphenated automatically determines the necessary hyphen break point without the need for additional logical manipulation.

For the particular preferred implementation being considered herein the particular hyphen break points for the C-V bit pattern values of FIG. 2 are indicated by a "hyphen" inserted at the desired break point.

In order to improve the accuracy of the above described logical hyphenation approach, the preferred implementations described herein additionally provide an exception capability which permits the break point determined by the C-V table to be examined along with the letters of the input word to determine, by reference to an exception table, whether an exception situation exists, in which case, the hyphen break point determined by the C-V table may appropriately be modified. If an exception is detected, the hyphen is shifted to the right or left, depending on the actual letters involved. For example, the combination "ch" may be stored in the exception table and the hyphen shifted properly if the C-V table provides a break point between "c" and "h".

Marks of punctuation are handled as exception conditions. For example, when the punctuation "-", "/", ".", ":", ";" occurs within the word examined, the word is broken at that point. Accordingly, "SDL/UPL" would be separated as "SDL/" with "UPL" being moved to the next line.

FIG. 3 generally illustrates one way in which the invention may be implemented using a hyphen control unit 10 in conjunction with a conventional computer 12 and printer 15. The hyphen control unit 10 serves to detect hyphenation situations with respect to words applied to the printer 15 by the computer 12. In response to the detection of a hyphenation situation for a particular word, the hyphen control unit 10 applies hyphen data to the printer to provide the proper hyphenation where appropriate.

Figure 4:
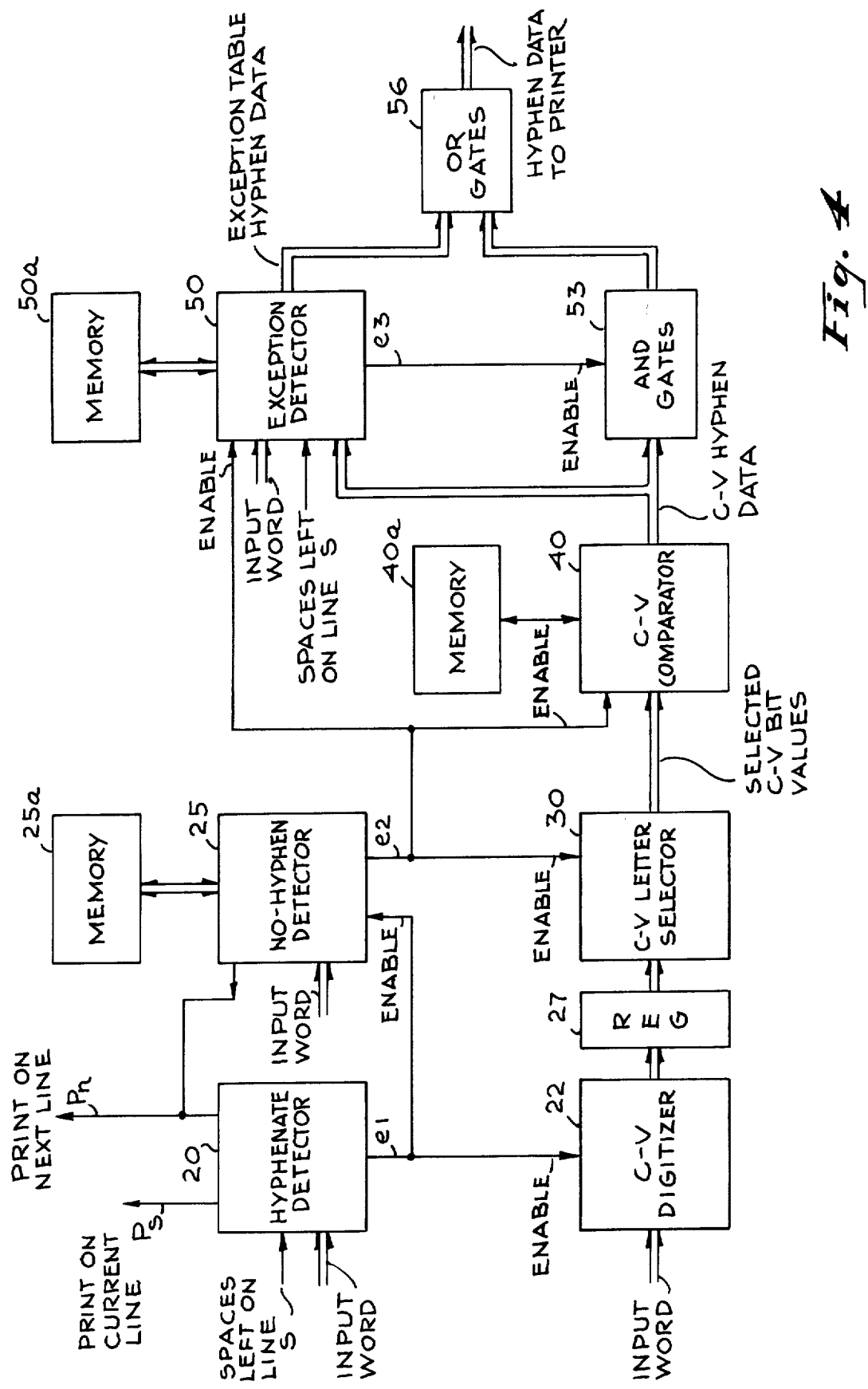
FIG. 4 is a schematic electrical block diagram illustrating how the hyphen control unit of FIG. 3 may be implemented to provide the operational steps of the flow chart of FIG. 5.

Referring next to FIG. 4, shown therein is a schematic electrical block diagram illustrating an exemplary construction and arrangement which may be employed for the hyphen control unit 10 of FIG. 3. Each input word to be printed is applied to a hyphenate detector 20 which also receives a signal S from the printer indicating the number of spaces left on the line currently being printed. If there are an adequate number of spaces to accommodate the input word, then a signal Ps is produced by the hyphenate detector 20 to indicate to the printer that the input word is to be printed on the current line being printed. If there are insufficient spaces on the current line to permit the input word to be printed and the input word has a length of eight or less letters, then the hyphenate detector 20 produces a signal Pn to indicate to the printer that the input word is to be printed on the next line.

However, if the input word length is greater than eight letters and there are insufficient spaces on the current line to print the input word, then the hyphenate detector 20 produces an enable signal e1 which enables a consonant-vowel digitizer 22 to convert the letters of the input word into "1" and "0" bit values based on whether a letter is a consonant or a vowel, respectively, the resultant C-V bit values being stored in a register 27.

The enable signal e1 produced by the hyphenate detector 20 is also applied as an enable input to a no-hyphen detector 25 which also receives the input word to be printed. The no-hyphen detector operates to detect whether the input word is of a type which is not to be hyphenated despite the presence of a hyphenate situation, such as would be the case, for example, for special words, symbols, and/or punctuation, for which hyphenation is not desirable. A memory 25a may be provided along with the no-hyphen detector 25 in order to provide adequate storage for the no-hyphen data which is provided for comparison with the input word in order to detect a no-hyphen condition. When a no-hyphen situation is detected, the no-hyphen detector 25 produces a signal Pn which causes the input word to be printed on the next line.

If a no-hyphen situation is not detected by the no-hyphen detector 25 with respect to the input word, then the no-hyphen detector 25 produces an enable signal e2 which enables a consonant-vowel letter selector 30, a consonant-vowel comparator 40 and an exception detector 50. The C-V letter selector 30 selects a predetermined group of the C-V digitized letters of the input word contained in register 27 for application to the C-V comparator 40. In the embodiment being described, the selected group is chosen to be the last five letters which will fit on the line, taking into account the need to provide a space for the hyphen at the end of the line. For the word "BURROUGHS" shown in FIG. 1, the selected group will thus be the letters RROUG which has the C-V bit values 11001.

The C-V comparator 40 operates in conjunction with an associated memory 40a containing the C-V table of FIG. 2 to determine whether the applied selected C-V bit values match any of the patterns contained in the C-V table. Depending upon the results of the comparison, the C-V comparator 40 provides C-V hyphen data at its output which either indicates the detected hyphen or break point based on the particular match detected, or else, indicates a no-match condition. The exception detector 50 responds to the C-V hyphen data produced by the C-V comparator 40 to either produce an enable signal e3 to enable AND gates 53 so as to permit this C-V hyphen data to be transmitted to the printer via AND gates 53 and OR gates 56, or else, provides its own hyphen data for transmission to the printer as a result of determining that the C-V hyphen data is either improper or incapable of providing proper hyphenation. More specifically, the exception detector 50 operates in response to the C-V hyphen data provided by the C-V comparator 40 in conjunction with the input word and spaces left signal S also applied thereto to determine, using an exception table contained in the memory 50a, whether an exception situation is present and, if so, to produce its own hyphen data for application to the printer via OR gates 56.

Figure 5:
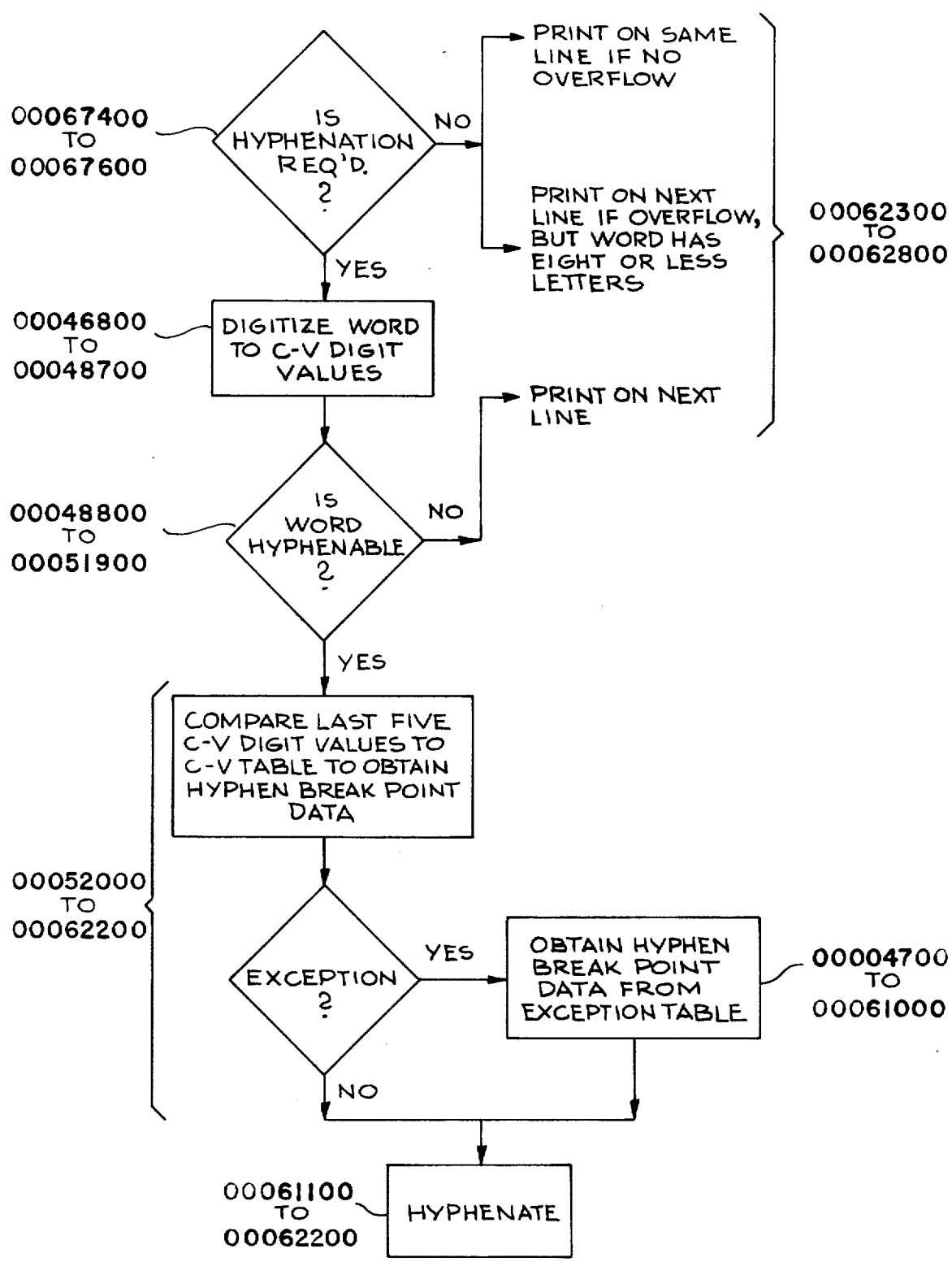
FIG. 5 is a flow chart generally illustrating how the invention may be implemented in a preferred manner by data processing software.

It is to be understood that the present invention may also be practiced using a software implementation as well as by the hardware implementation illustrated in FIGS. 3 and 4. FIG. 5 is a flow chart summarizing the various operations and decisions which may typically be provided in a program designed to carry out the present invention. A program for implementing the flow chart of FIG. 5 may readily be provided by those skilled in the art suitable for use with a commercially available general purpose computer. For example, a program can be designed based on the flow chart of FIG. 5 which is suitable for running on a commercially available Burroughs B 1700 computer system in order to provide hyphenation of words applied to a Burroughs B 9247-13 printer, which is also commercially available. In such a case the C-V table, the exception table and other required stored data would be stored in the computer memory. An example of such a program in Burroughs Software Development Language (SDL) is presented below. For ease of understanding, corresponding portions of the flow chart of FIG. 5 have been provided with ranges of sequence numbers of the program identifying the particular portions of the program which perform the operations and/or decisions indicated.

```
0   0   00000000 :PROCEDURE HYPHENATE;                                                        ! HYPHENATE
1   0   00000100 :DECLARE DYNAMIC MASK         BIT (WRD,LGTH));                               ! HYPHENATE
1   0   00000200 :DECLARE ACTION               BIT (4),                                       ! HYPHENATE
1   0   00000300 :          COLS,LEFT          FIXED,                                         ! HYPHENATE
1   0   00000400 :          CNTR               FIXED,                                         ! HYPHENATE
1   0   00000500 :          HYP,CNT            FIXED;                                         ! HYPHENATE
1   0   00000600 :%                                                                           ! HYPHENATE
1   0   00000700 :PROCEDURE  CHECK,SINGLE  (NUM)  BIT (4);                                    ! CHECK,SING
1   0   00000800 :FORMAL NUM BIT (8);                                                         ! CHECK,SING
2   0   00000900 :IF    (U,CHAR(NUM) = "H" OR                                                 ! CHECK,SING
2   0   00001000 :       U,CHAR(NUM) = "T" OR                                                 ! CHECK,SING
2   0   00001100 :       U,CHAR(NUM) = "U") AND                                               ! CHECK,SING
2   0   00001200 :          U,CHAR(NUM+1) = "E" AND NOT                                       ! CHECK,SING
2   0   00001300 :             (U,CHAR(NUM+2) = "R" OR                                        ! CHECK,SING
2   0   00001400 :              U,CHAR(NUM+2) = "S" OR                                        ! CHECK,SING
2   0   00001500 :              U,CHAR(NUM+2) = "D" OR                                        ! CHECK,SING
2   0   00001600 :              U,CHAR(NUM+2) = "N")                                          ! CHECK,SING
2   0   00001700 :    THEN RETURN 2;                                                          ! CHECK,SING
2   1   00001800 :IF M,CHAR(NUM+3) = 0 OR M,CHAR(NUM+3) = " "                                 ! CHECK,SING
2   0   00001900 :    THEN DO CHECK,SUFFIX;                                                   ! CHECK,SING
2   1   00002000 :%                                                                           ! CHECK,SING
2   1   00002100 :IF    U,CHAR(NUM+1) = "A" AND                                               ! CHECK,SING
2   1   00002200 :     (U,CHAR(NUM) = "V" AND U,CHAR(NUM+2) = "L")                            ! CHECK,SING
2   1   00002300 :    THEN RETURN 1;                                                          ! CHECK,SING
2   2   00002400 :IF    U,CHAR(NUM+1) = "E" AND                                               ! CHECK,SING
2   1   00002500 :     (U,CHAR(NUM) = "I" AND U,CHAR(NUM+2) = "N"  OR                         ! CHECK,SING
2   1   00002600 :      U,CHAR(NUM) = "N" AND U,CHAR(NUM+2) = "D"  OR                         ! CHECK,SING
2   1   00002700 :      U,CHAR(NUM) = "V" AND U,CHAR(NUM+2) = "R"  OR                         ! CHECK,SING
2   1   00002800 :      U,CHAR(NUM) = "V" AND U,CHAR(NUM+2) = "M")                            ! CHECK,SING
2   1   00002900 :    THEN RETURN 1;                                                          ! CHECK,SING
2   2   00003000 :IF    U,CHAR(NUM+1) = "I" AND                                               ! CHECK,SING
2   1   00003100 :     (U,CHAR(NUM) = "M" AND U,CHAR(NUM+2) = "N"  OR                         ! CHECK,SING
2   1   00003200 :      U,CHAR(NUM) = "E" AND U,CHAR(NUM+2) = "N"  OR                         ! CHECK,SING
2   1   00003300 :      U,CHAR(NUM) = "R" AND U,CHAR(NUM+2) = "C"  OR                         ! CHECK,SING
2   1   00003400 :      U,CHAR(NUM) = "N" AND U,CHAR(NUM+2) = "Z"  OR                         ! CHECK,SING
2   1   00003500 :      U,CHAR(NUM) = "N" AND U,CHAR(NUM+2) = "Z"  OR                         ! CHECK,SING
2   1   00003600 :      U,CHAR(NUM) = "C" AND U,CHAR(NUM+2) = "P")                            ! CHECK,SING
2   1   00003700 :    THEN RETURN 1;                                                          ! CHECK,SING
2   2   00003800 :IF    U,CHAR(NUM+1) = "O" AND                                               ! CHECK,SING
2   1   00003900 :     (U,CHAR(NUM) = "N" AND U,CHAR(NUM+2) = "L")                            ! CHECK,SING
2   1   00004000 :    THEN RETURN 1;                                                          ! CHECK,SING
2   2   00004100 :IF    U,CHAR(NUM+1) = "U" AND                                               ! CHECK,SING
2   1   00004200 :     (U,CHAR(NUM) = "C" AND U,CHAR(NUM+2) = "L")                            ! CHECK,SING
2   1   00004300 :    THEN RETURN 1; ELSE                                                     ! CHECK,SING
2   1   00004400 :    RETURN 0;                                                               ! CHECK,SING
2   2   00004500 :END CHECK,SUFFIX;                                                           ! CHECK,SING
2   1   00004600 :IF M,CHAR(NUM+3) = 1                                                        ! CHECK,SING
2   0   00004700 :    THEN DO;                                                                ! CHECK,SING
2   1   00004800 :IF U,CHAR(NUM+1) = "A" AND                                                  ! CHECK,SING
2   1   00004900 :     (U,CHAR(NUM) NEQ "C" AND U,CHAR(NUM+2) = "B"  OR                       ! CHECK,SING
2   1   00005000 :      U,CHAR(NUM) = "R" AND U,CHAR(NUM+2) = "N")                            ! CHECK,SING
2   1   00005100 :    THEN RETURN 1;                                                          ! CHECK,SING
2   2   00005200 :IF U,CHAR(NUM+1) = "E" AND                                                  ! CHECK,SING
2   1   00005300 :     (U,CHAR(NUM) = "L" AND U,CHAR(NUM+2) = "R"  OR                         ! CHECK,SING
2   1   00005400 :      U,CHAR(NUM) = "R" AND U,CHAR(NUM+2) = "N"  OR                         ! CHECK,SING
2   1   00005500 :      U,CHAR(NUM) = "D" AND U,CHAR(NUM+2) = "N"  OR                         ! CHECK,SING
2   1   00005600 :                             U,CHAR(NUM+2) = "O"  OR                        ! CHECK,SING
2   1   00005700 :                             U,CHAR(NUM+2) = "S")                           ! CHECK,SING
2   1   00005800 :    THEN RETURN 1;                                                          ! CHECK,SING
2   2   00005900 :IF U,CHAR(NUM+1) = "I" AND                                                  ! CHECK,SING
2   1   00006000 :     (U,CHAR(NUM) = "P" AND U,CHAR(NUM+2) = "E"  OR                         ! CHECK,SING
2   1   00006100 :      U,CHAR(NUM) = "R" AND U,CHAR(NUM+2) = "E"  OR                         ! CHECK,SING
2   1   00006200 :      U,CHAR(NUM) = "J" AND U,CHAR(NUM+2) = "E"  OR                         ! CHECK,SING
2   1   00006300 :                             U,CHAR(NUM+2) = "N"  OR                        ! CHECK,SING
2   1   00006400 :      U,CHAR(NUM) = "C" AND U,CHAR(NUM+2) = "A"  OR                         ! CHECK,SING
2   1   00006500 :      U,CHAR(NUM) = "C" AND U,CHAR(NUM+2) = "T")                            ! CHECK,SING
2   1   00006600 :    THEN RETURN 1;                                                          ! CHECK,SING
2   2   00006700 :IF U,CHAR(NUM+1) = "O" AND                                                  ! CHECK,SING
2   1   00006800 :     (U,CHAR(NUM) = "N" AND U,CHAR(NUM+2) = "L" OR                          ! CHECK,SING
2   1   00006900 :                             U,CHAR(NUM+2) = "S")                           ! CHECK,SING
2   1   00007000 :    THEN RETURN 1;                                                          ! CHECK,SING
2   2   00007100 :IF U,CHAR(NUM+1) = "U" AND                                                  ! CHECK,SING
2   1   00007200 :     (U,CHAR(NUM) = "R" AND U,CHAR(NUM+2) = "I")                            ! CHECK,SING
2   1   00007300 :    THEN RETURN 1;                                                          ! CHECK,SING
2   2   00007400 :    ELSE RETURN 0;                                                          ! CHECK,SING
2   2   00007500 :END;                                                                        ! CHECK,SING
2   1   00007600 :END CHECK,SINGLE;                                                           ! CHECK,SING
1   0   00007700 :%                                                                           
1   0   00007800 :PROCEDURE CHECK,DOUBLE  (NUM)  BIT(4);                                      ! CHECK,DOUB
1   0   00007900 :FORMAL NUM BIT (8);                                                         ! CHECK,DOUB
2   0   00008000 : IF    (U,CHAR(NUM-1) = "C" OR U,CHAR(NUM-1) = "G" OR                       ! CHECK,DOUB
2   0   00008100 :        U,CHAR(NUM-1) = "P" OR U,CHAR(NUM-1) = "S") AND                     ! CHECK,DOUB
2   0   00008200 :           U,CHAR(NUM) = "H"                                                ! CHECK,DOUB
2   0   00008300 :   OR   U,CHAR(NUM) = "T" AND                                               ! CHECK,DOUB
2   0   00008400 :           U,CHAR(NUM) = "H" AND NOT                                        ! CHECK,DOUB
2   0   00008500 :              (U,CHAR(NUM+1) = "I" OR                                       ! CHECK,DOUB
2   0   00008600 :               U,CHAR(NUM+1) = "E")                                         ! CHECK,DOUB
2   0   00008700 :   OR  (U,CHAR(NUM-1) = "R" OR U,CHAR(NUM-1) = "C" OR                       ! CHECK,DOUB
2   0   00008800 :        U,CHAR(NUM-1) = "N") AND                                            ! CHECK,DOUB
2   0   00008900 :           U,CHAR(NUM) = "K"                                                ! CHECK,DOUB
2   0   00009000 :   OR  (U,CHAR(NUM-1) = "N" OR U,CHAR(NUM-1) = "R") AND                     ! CHECK,DOUB
2   0   00009100 :              (U,CHAR(NUM) = "G" OR                                         ! CHECK,DOUB
2   0   00009200 :               U,CHAR(NUM) = "O") AND NOT                                   ! CHECK,DOUB
2   0   00009300 :                             U,CHAR(NUM+1) = "E"                           ! CHECK,DOUB
2   0   00009400 :   OR   U,CHAR(NUM-1) = "N" AND                                             ! CHECK,DOUB
2   0   00009500 :           U,CHAR(NUM) = "L"                                                ! CHECK,DOUB
2   0   00009600 :    THEN RETURN 2;                                                          ! CHECK,DOUB
2   1   00009700 :IF    (U,CHAR(NUM-1) = "C" OR U,CHAR(NUM-1) = "N" OR                        ! CHECK,DOUB
2   0   00009800 :       U,CHAR(NUM-1) = "R" OR U,CHAR(NUM-1) = "S") AND                      ! CHECK,DOUB
2   0   00009900 :           U,CHAR(NUM) = "T"                                                ! CHECK,DOUB
```

```
                    OR (U.CHAR(NUM-1) = "L" OR U.CHAR(NUM-1) = "F" OR
                        U.CHAR(NUM-1) = "P") AND
                                    U.CHAR(NUM) = "T" AND
                                        U.CHAR(NUM+1) = "A"
                    OR U.CHAR(NUM-1) = "S" AND)
                                   (U.CHAR(NUM) = "S" OR
                                    U.CHAR(NUM) = "P")
                    OR (U.CHAR(NUM-1) = "G" OR U.CHAR(NUM-1) = "R") AND
                                    U.CHAR(NUM) = "N"
                    THEN IF NOT    (U.CHAR(NUM+1) = "U" OR
                                    U.CHAR(NUM+1) = "O" OR
                                    U.CHAR(NUM+1) = "Y")    AND NOT
                                   (U.CHAR(NUM+2) = "O" OR
                                    U.CHAR(NUM+2) = "V" OR
                                    U.CHAR(NUM+2) = "T" OR
                                    U.CHAR(NUM+2) = "E" OR
                                    U.CHAR(NUM+2) = "I" OR                %3/22%
                                    U.CHAR(NUM+2) = "A" OR
                                    U.CHAR(NUM+2) = "G" OR
                                    U.CHAR(NUM+2) = "R")
                            THEN RETURN 2;
        IF          U.CHAR(NUM) = "R" AND  NOT
                   (U.CHAR(NUM-1) = "R" OR
                    U.CHAR(NUM-1) = "B")
        OR          U.CHAR(NUM) = "L" AND NOT
                   (U.CHAR(NUM-1) = "L" OR U.CHAR(NUM-1) = "B" OR
                    U.CHAR(NUM-1) = "R")
        OR (U.CHAR(NUM-1) = "K" OR U.CHAR(NUM-1) = "P" OR
            U.CHAR(NUM-1) = "R" OR U.CHAR(NUM-1) = "T") AND
                    U.CHAR(NUM) = "H"
        OR  U.CHAR(NUM-1) = "K" AND U.CHAR(NUM) = "N"
                THEN RETURN 1; ELSE
                    RETURN 0;
        END CHECK.DOUBLE;

PROCEDURE CHECK.TRIPLE (NUM) BIT (4);
FORMAL NUM BIT (8);

IF      U.CHAR(NUM-1) = "M" AND
            U.CHAR(NUM) = "P" AND
                    U.CHAR(NUM+1) = "T"
    OR (U.CHAR(NUM-1) = "T" OR
        U.CHAR(NUM-1) = "N" OR
        U.CHAR(NUM-1) = "H") AND
                U.CHAR(NUM) = "C" AND
                    U.CHAR(NUM+1) = "H"
    OR  U.CHAR(NUM-1) = "G" AND
        U.CHAR(NUM) = "H" AND
                    U.CHAR(NUM+1) = "T"
    OR  U.CHAR(NUM-1) = "P" AND
        U.CHAR(NUM) = "T" AND
                    U.CHAR(NUM+1) = "H"
            THEN IF U.CHAR(NUM+2) NEQ "A"
            THEN RETURN 3;
    IF      U.CHAR(NUM-1) = "S" AND U.CHAR(NUM) = "S"
    OR  U.CHAR(NUM-1) = "N" AND
                U.CHAR(NUM) = "S" AND NOT
                   (U.CHAR(NUM+1) = "T" OR
                    U.CHAR(NUM+1) = "H")
    OR (U.CHAR(NUM-1) = "L" OR U.CHAR(NUM-1) = "C" OR
        U.CHAR(NUM-1) = "F" OR U.CHAR(NUM-1) = "S") AND
                U.CHAR(NUM) = "T" AND
                    U.CHAR(NUM+1) NEQ "R"
    OR (U.CHAR(NUM-1) = "R" OR U.CHAR(NUM-1) = "G" OR
        U.CHAR(NUM-1) = "K") AND
                   (U.CHAR(NUM) = "H" OR U.CHAR(NUM) = "F" OR
                    U.CHAR(NUM) = "S") AND NOT
                           (U.CHAR(NUM+1) = "L" OR
                            U.CHAR(NUM+1) = "T" OR
                            U.CHAR(NUM+1) = "H")
    OR (U.CHAR(NUM-1) = "R" OR U.CHAR(NUM-1) = "C" OR
        U.CHAR(NUM-1) = "N") AND
                U.CHAR(NUM) = "K" AND
                    U.CHAR(NUM+1) NEQ "N"
        THEN RETURN 2;
    IF      U.CHAR(NUM-1) = "N" AND
                   (U.CHAR(NUM) = "G" OR
                    U.CHAR(NUM) = "C")  AND NOT
                           (U.CHAR(NUM+1) = "L" OR
                            U.CHAR(NUM+1) = "H")
    OR (U.CHAR(NUM-1) = "N" OR U.CHAR(NUM-1) = "R") AND
                U.CHAR(NUM) = "D"
    OR (U.CHAR(NUM-1) = "C" OR U.CHAR(NUM-1) = "T" OR
        U.CHAR(NUM-1) = "P") AND
                U.CHAR(NUM) = "H"                                %3/5%
    OR (U.CHAR(NUM-1) = "P" OR
        U.CHAR(NUM-1) = "C" OR
        U.CHAR(NUM-1) = "W") AND)
```

```
2   0   00023400  :              U.CHAR(NUM) = "T" AND NOT              : CHECK,TRIP
2   0   00023500  :                       (U.CHAR(NUM+1) = "H" OR       : CHECK,TRIP
2   0   00023600  :                        U.CHAR(NUM+1) = "R")         : CHECK,TRIP
2   0   00023700  :     OR  U.CHAR(NUM-1) = "H" AND                     : CHECK,TRIP
2   0   00023800  :              U.CHAR(NUM) = "P" AND NOT              : CHECK,TRIP
2   0   00023900  :                       (U.CHAR(NUM+1) = "T" OR       : CHECK,TRIP
2   0   00024000  :                        U.CHAR(NUM+1) = "H" OR  %3/5%: CHECK,TRIP
2   0   00024100  :                        U.CHAR(NUM+1) = "L")         : CHECK,TRIP
2   0   00024200  :     OR  U.CHAR(NUM-1) = "R" AND                     : CHECK,TRIP
2   0   00024300  :              U.CHAR(NUM) = "T" AND                  : CHECK,TRIP
2   0   00024400  :                        U.CHAR(NUM+1) NEQ "H"        : CHECK,TRIP
2   0   00024500  :     OR  U.CHAR(NUM-1) = "T" AND                     : CHECK,TRIP
2   0   00024600  :              U.CHAR(NUM) = "H"                      : CHECK,TRIP
2   0   00024700  :         THEN RETURN 2;                              : CHECK,TRIP
2   1   00024800  :%                                                    : CHECK,TRIP
2   1   00024900  : IF    U.CHAR(NUM-1) NEQ "R" AND U.CHAR(NUM) = "R"   : CHECK,TRIP
2   0   00025000  :    OR     U.CHAR(NUM) = "L" AND NOT                 : CHECK,TRIP
2   0   00025100  :           (U.CHAR(NUM-1) = "L" OR U.CHAR(NUM-1) = "B" OR : CHECK,TRIP
2   0   00025200  :            U.CHAR(NUM-1) = "R")                     : CHECK,TRIP
2   0   00025300  :    OR  U.CHAR(NUM-1) = "S" AND                      : CHECK,TRIP
2   0   00025400  :           (U.CHAR(NUM) = "T" OR                     : CHECK,TRIP
2   0   00025500  :            U.CHAR(NUM) = "C") AND                   : CHECK,TRIP
2   0   00025600  :            U.CHAR(NUM+1) = "R"                      : CHECK,TRIP
2   0   00025700  :    OR        U.CHAR(NUM) = "F" AND                  : CHECK,TRIP
2   0   00025800  :            U.CHAR(NUM-1) = "F"                      : CHECK,TRIP
2   0   00025900  :        THEN RETURN 1; ELSE                          : CHECK,TRIP
2   0   00026000  :             RETURN 0;                               : CHECK,TRIP
2   1   00026100  ; END CHECK,TRIPLET                                   : CHECK,TRIP
1   0   00026200  :%
1   0   00026300  ; PROCEDURE CHECK,QUAD    (NUM)  BIT (4);
1   0   00026400  ; FORMAL NUM BIT (8);
2   0   00026500  :%                                                    : CHECK,QUAD
2   0   00026600  : IF    U.CHAR(NUM-1) = "H" AND                       : CHECK,QUAD
2   0   00026700  :              U.CHAR(NUM) = "P" AND                  : CHECK,QUAD
2   0   00026800  :              U.CHAR(NUM+1) = "T"                    : CHECK,QUAD
2   0   00026900  :    OR (U.CHAR(NUM-1) = "T" OR                       : CHECK,QUAD
2   0   00027000  :        U.CHAR(NUM-1) = "N" OR                       : CHECK,QUAD
2   0   00027100  :        U.CHAR(NUM-1) = "H") AND                     : CHECK,QUAD
2   0   00027200  :              U.CHAR(NUM) = "C" AND                  : CHECK,QUAD
2   0   00027300  :              U.CHAR(NUM+1) = "H"                    : CHECK,QUAD
2   0   00027400  :    OR  U.CHAR(NUM-1) = "G" AND                      : CHECK,QUAD
2   0   00027500  :              U.CHAR(NUM) = "H" AND                  : CHECK,QUAD
2   0   00027600  :              U.CHAR(NUM+1) = "T"                    : CHECK,QUAD
2   0   00027700  :    OR  U.CHAR(NUM-1) = "P" AND                      : CHECK,QUAD
2   0   00027800  :              U.CHAR(NUM) = "T" AND                  : CHECK,QUAD
2   0   00027900  :              U.CHAR(NUM+1) = "H"                    : CHECK,QUAD
2   0   00028000  :        THEN RETURN 3;                               : CHECK,QUAD
2   1   00028100  : IF    U.CHAR(NUM-1) = "S" AND U.CHAR(NUM) = "S"     : CHECK,QUAD
2   0   00028200  :    OR  U.CHAR(NUM-1) = "N" AND                      : CHECK,QUAD
2   0   00028300  :              U.CHAR(NUM) = "S" AND NOT              : CHECK,QUAD
2   0   00028400  :                       (U.CHAR(NUM+1) = "T" OR       : CHECK,QUAD
2   0   00028500  :                        U.CHAR(NUM+1) = "H")         : CHECK,QUAD
2   0   00028600  :    OR (U.CHAR(NUM-1) = "L" OR U.CHAR(NUM-1) = "C" OR : CHECK,QUAD
2   0   00028700  :        U.CHAR(NUM-1) = "F" OR U.CHAR(NUM-1) = "S") AND : CHECK,QUAD
2   0   00028800  :              U.CHAR(NUM) = "T" AND                  : CHECK,QUAD
2   0   00028900  :              U.CHAR(NUM+1) NEQ "R"                  : CHECK,QUAD
2   0   00029000  :    OR (U.CHAR(NUM-1) = "R" OR U.CHAR(NUM-1) = "G" OR : CHECK,QUAD
2   0   00029100  :        U.CHAR(NUM-1) = "K") AND                     : CHECK,QUAD
2   0   00029200  :              (U.CHAR(NUM) = "N" OR U.CHAR(NUM) = "F" OR : CHECK,QUAD
2   0   00029300  :               U.CHAR(NUM) = "S")                    : CHECK,QUAD
2   0   00029400  :    OR (U.CHAR(NUM-1) = "H" OR U.CHAR(NUM-1) = "C" OR : CHECK,QUAD
2   0   00029500  :        U.CHAR(NUM-1) = "R") AND                     : CHECK,QUAD
2   0   00029600  :              U.CHAR(NUM) = "K" AND                  : CHECK,QUAD
2   0   00029700  :              U.CHAR(NUM+1) NEQ "N"                  : CHECK,QUAD
2   0   00029800  :        THEN RETURN 2;                               : CHECK,QUAD
2   1   00029900  :%                                                    : CHECK,QUAD
2   1   00030000  : IF    U.CHAR(NUM-1) = "N" AND                       : CHECK,QUAD
2   0   00030100  :           (U.CHAR(NUM) = "G" OR                     : CHECK,QUAD
2   0   00030200  :            U.CHAR(NUM) = "C") AND NOT               : CHECK,QUAD
2   0   00030300  :           (U.CHAR(NUM+1) = "L" OR                   : CHECK,QUAD
2   0   00030400  :            U.CHAR(NUM+1) = "H")                     : CHECK,QUAD
2   0   00030500  :    OR (U.CHAR(NUM-1) = "N" OR U.CHAR(NUM-1) = "R") AND : CHECK,QUAD
2   0   00030600  :              U.CHAR(NUM) = "D"                      : CHECK,QUAD
2   0   00030700  :    OR (U.CHAR(NUM-1) = "C" OR U.CHAR(NUM-1) = "T" OR : CHECK,QUAD
2   0   00030800  :        U.CHAR(NUM-1) = "P") AND
2   0   00030900  :              U.CHAR(NUM) = "H"                 %3/5%: CHECK,QUAD
2   0   00031000  :    OR (U.CHAR(NUM-1) = "P" OR U.CHAR(NUM-1) = "C") AND : CHECK,QUAD
2   0   00031100  :              U.CHAR(NUM) = "T" AND                  : CHECK,QUAD
2   0   00031200  :              U.CHAR(NUM+1) NEQ "H"                  : CHECK,QUAD
2   0   00031300  :    OR  U.CHAR(NUM-1) = "H" AND                      : CHECK,QUAD
2   0   00031400  :              U.CHAR(NUM) = "P" AND NOT              : CHECK,QUAD
2   0   00031500  :                       (U.CHAR(NUM+1) = "T" OR       : CHECK,QUAD
2   0   00031600  :                        U.CHAR(NUM+1) = "H" OR  %3/5%: CHECK,QUAD
2   0   00031700  :                        U.CHAR(NUM+1) = "L")         : CHECK,QUAD
2   0   00031800  :    OR  U.CHAR(NUM-1) = "R" AND                      : CHECK,QUAD
2   0   00031900  :              U.CHAR(NUM) = "T" AND                  : CHECK,QUAD
2   0   00032000  :                        U.CHAR(NUM+1) NEQ "H"        : CHECK,QUAD
2   0   00032100  :    OR  U.CHAR(NUM-1) = "T" AND                      : CHECK,QUAD
2   0   00032200  :              U.CHAR(NUM) = "H"                      : CHECK,QUAD
2   0   00032300  :        THEN RETURN 2;                               : CHECK,QUAD
2   1   00032400  :%                                                    : CHECK,QUAD
2   1   00032500  : IF    U.CHAR(NUM-1) NEQ "R" AND U.CHAR(NUM) = "R"   : CHECK,QUAD
2   0   00032600  :    OR     U.CHAR(NUM) = "L" AND NOT                 : CHECK,QUAD
2   0   00032700  :           (U.CHAR(NUM-1) = "L" OR U.CHAR(NUM-1) = "B" OR : CHECK,QUAD
2   0   00032800  :            U.CHAR(NUM-1) = "R")                     : CHECK,QUAD
2   0   00032900  :    OR  U.CHAR(NUM-1) = "S" AND                      : CHECK,QUAD
2   0   00033000  :              U.CHAR(NUM) = "T" AND                  : CHECK,QUAD
2   0   00033100  :              U.CHAR(NUM+1) = "R"                    : CHECK,QUAD
2   0   00033200  :        THEN RETURN 1; ELSE                          : CHECK,QUAD
2   0   00033300  :             RETURN 0;                               : CHECK,QUAD
2   1   00033400  ; END CHECK,QUAD;                                     : CHECK,QUAD
1   0   00033500  :%
```

```
1  0  00033600 ;PROCEDURE CHECK.EITHER  (NUM) BIT(4);        %PATTERNS 3,19,25,27%   1  CHECK.EITH
1  0  00033700 ;FORMAL NUM BIT (8)                                                   1  CHECK.EITH
2  0  00033800 ;  IF M.CHAR(NUM+1) = 0                                                1  CHECK.EITH
2  0  00033900 ;     THEN DO;                                                          1  CHECK.EITH
2  1  00034000 ;     IF    (U.CHAR(NUM-1) = "C" OR U.CHAR(NUM-1) = "G" OR              1  CHECK.EITH
2  1  00034100 ;                 U.CHAR(NUM-1) = "P" OR U.CHAR(NUM-1) = "S") AND       1  CHECK.EITH
2  1  00034200 ;                 U.CHAR(NUM) = "H"                                     1  CHECK.EITH
2  1  00034300 ;        OR U.CHAR(NUM-1) = "T" AND                                     1  CHECK.EITH
2  1  00034400 ;                 U.CHAR(NUM) = "H" AND NOT                             1  CHECK.EITH
2  1  00034500 ;                    (U.CHAR(NUM+1) = "I" OR                            1  CHECK.EITH
2  1  00034600 ;                     U.CHAR(NUM+1) = "E")                              1  CHECK.EITH
2  1  00034700 ;        OR (U.CHAR(NUM-1) = "R" OR U.CHAR(NUM-1) = "C" OR              1  CHECK.EITH
2  1  00034800 ;            U.CHAR(NUM-1) = "N") AND                                   1  CHECK.EITH
2  1  00034900 ;                 U.CHAR(NUM) = "K"                                     1  CHECK.EITH
2  1  00035000 ;        OR (U.CHAR(NUM-1) = "N" OR U.CHAR(NUM-1) = "R") AND            1  CHECK.EITH
2  1  00035100 ;                 (U.CHAR(NUM) = "G" OR                                 1  CHECK.EITH
2  1  00035200 ;                  U.CHAR(NUM) = "D") AND NOT                           1  CHECK.EITH
2  1  00035300 ;                        U.CHAR(NUM+1) = "E"                            1  CHECK.EITH
2  1  00035400 ;        OR U.CHAR(NUM-1) = "W" AND                                     1  CHECK.EITH
2  1  00035500 ;                 U.CHAR(NUM) = "L"                                     1  CHECK.EITH
2  1  00035600 ;        THEN RETURN 2;                                                 1  CHECK.EITH
2  2  00035700 ;%                                                                      1  CHECK.EITH
2  2  00035800 ;  IF    (U.CHAR(NUM-1) = "C" OR U.CHAR(NUM-1) = "N" OR                 1  CHECK.EITH
2  1  00035900 ;         U.CHAR(NUM-1) = "R" OR U.CHAR(NUM-1) = "S") AND               1  CHECK.EITH
2  1  00036000 ;                 U.CHAR(NUM) = "T"                        %3/5%        1  CHECK.EITH
2  1  00036100 ;     OR (U.CHAR(NUM-1) = "L" OR U.CHAR(NUM-1) = "F" OR                 1  CHECK.EITH
2  1  00036200 ;         U.CHAR(NUM-1) = "P") AND                                      1  CHECK.EITH
2  1  00036300 ;                 U.CHAR(NUM) = "T"                                     1  CHECK.EITH
2  1  00036400 ;     OR U.CHAR(NUM-1) = "S" AND                                        1  CHECK.EITH
2  1  00036500 ;                 U.CHAR(NUM) = "S"                                     1  CHECK.EITH
2  1  00036600 ;     THEN IF NOT     (U.CHAR(NUM+1) = "U" OR                           1  CHECK.EITH
2  2  00036700 ;                      U.CHAR(NUM+1) = "Y") AND NOT                     1  CHECK.EITH
2  2  00036800 ;                     (U.CHAR(NUM+2) = "U" OR                           1  CHECK.EITH
2  2  00036900 ;                      U.CHAR(NUM+2) = "V" OR                           1  CHECK.EITH
2  2  00037000 ;                      U.CHAR(NUM+2) = "I" OR                           1  CHECK.EITH
2  2  00037100 ;                      U.CHAR(NUM+2) = "T" OR                           1  CHECK.EITH
2  2  00037200 ;                      U.CHAR(NUM+2) = "A" OR                           1  CHECK.EITH
2  2  00037300 ;                      U.CHAR(NUM+2) = "G" OR                           1  CHECK.EITH
2  2  00037400 ;                      U.CHAR(NUM+2) = "R")                             1  CHECK.EITH
2  2  00037500 ;        THEN RETURN 2;                                                 1  CHECK.EITH
2  3  00037600 ;%                                                                      1  CHECK.EITH
2  3  00037700 ;  IF    U.CHAR(NUM) = "R" AND NOT                                      1  CHECK.EITH
2  1  00037800 ;            (U.CHAR(NUM-1) = "K" OR                                    1  CHECK.EITH
2  1  00037900 ;             U.CHAR(NUM-1) = "B")                                      1  CHECK.EITH
2  1  00038000 ;     OR     U.CHAR(NUM) = "L" AND NOT                                  1  CHECK.EITH
2  1  00038100 ;            (U.CHAR(NUM-1) = "L" OR U.CHAR(NUM-1) = "B" OR             1  CHECK.EITH
2  1  00038200 ;             U.CHAR(NUM-1) = "R")                                      1  CHECK.EITH
2  1  00038300 ;     OR (U.CHAR(NUM-1) = "W" OR U.CHAR(NUM-1) = "P" OR                 1  CHECK.EITH
2  1  00038400 ;         U.CHAR(NUM-1) = "R" OR U.CHAR(NUM-1) = "T") AND               1  CHECK.EITH
2  1  00038500 ;                 U.CHAR(NUM) = "H"                                     1  CHECK.EITH
2  1  00038600 ;     OR U.CHAR(NUM-1) = "K" AND U.CHAR(NUM) = "N"                      1  CHECK.EITH
2  1  00038700 ;     THEN RETURN 1; ELSE                                               1  CHECK.EITH
2  1  00038800 ;          RETURN 0;                                                    1  CHECK.EITH
2  2  00038900 ;  END;                                                                 1  CHECK.EITH
2  1  00039000 ;  IF    U.CHAR(NUM-1) = "M" AND                                       1  CHECK.EITH
2  0  00039100 ;           U.CHAR(NUM) = "P" AND                                       1  CHECK.EITH
2  0  00039200 ;                 U.CHAR(NUM+1) = "T"                                   1  CHECK.EITH
2  0  00039300 ;     OR (U.CHAR(NUM-1) = "T" OR                                        1  CHECK.EITH
2  0  00039400 ;         U.CHAR(NUM-1) = "N" OR                                        1  CHECK.EITH
2  0  00039500 ;         U.CHAR(NUM-1) = "H") AND                                      1  CHECK.EITH
2  0  00039600 ;                 U.CHAR(NUM) = "C" AND                                 1  CHECK.EITH
2  0  00039700 ;                 U.CHAR(NUM+1) = "H"                                   1  CHECK.EITH
2  0  00039800 ;     OR U.CHAR(NUM-1) = "G" AND                                        1  CHECK.EITH
2  0  00039900 ;                 U.CHAR(NUM) = "H" AND                                 1  CHECK.EITH
2  0  00040000 ;                 U.CHAR(NUM+1) = "T"                                   1  CHECK.EITH
2  0  00040100 ;     OR U.CHAR(NUM-1) = "P" AND                                        1  CHECK.EITH
2  0  00040200 ;                 U.CHAR(NUM) = "T" AND                                 1  CHECK.EITH
2  0  00040300 ;                 U.CHAR(NUM+1) = "H"                                   1  CHECK.EITH
2  0  00040400 ;     THEN IF  U.CHAR(NUM+2) NEQ "A"                                    1  CHECK.EITH
2  1  00040500 ;        THEN RETURN 3;                                                 1  CHECK.EITH
2  2  00040600 ;  IF    U.CHAR(NUM-1) = "S" AND U.CHAR(NUM) = "S"                      1  CHECK.EITH
2  0  00040700 ;     OR U.CHAR(NUM-1) = "R" AND                                        1  CHECK.EITH
2  0  00040800 ;                 U.CHAR(NUM) = "S" AND NOT                             1  CHECK.EITH
2  0  00040900 ;                    (U.CHAR(NUM+1) = "T" OR                            1  CHECK.EITH
2  0  00041000 ;                     U.CHAR(NUM+1) = "H")                              1  CHECK.EITH
2  0  00041100 ;     OR (U.CHAR(NUM-1) = "L" OR U.CHAR(NUM-1) = "C" OR                 1  CHECK.EITH
2  0  00041200 ;         U.CHAR(NUM-1) = "F" OR U.CHAR(NUM-1) = "S") AND               1  CHECK.EITH
2  0  00041300 ;                 U.CHAR(NUM) = "T" AND                                 1  CHECK.EITH
2  0  00041400 ;                 U.CHAR(NUM+1) NEQ "R"                                 1  CHECK.EITH
2  0  00041500 ;     OR (U.CHAR(NUM-1) = "W" OR U.CHAR(NUM-1) = "G" OR                 1  CHECK.EITH
2  0  00041600 ;         U.CHAR(NUM-1) = "K") AND                                      1  CHECK.EITH
2  0  00041700 ;                 (U.CHAR(NUM) = "N" OR U.CHAR(NUM) = "F" OR            1  CHECK.EITH
2  0  00041800 ;                  U.CHAR(NUM) = "S") AND NOT                           1  CHECK.EITH
2  0  00041900 ;                    (U.CHAR(NUM+1) = "T" OR                            1  CHECK.EITH
2  0  00042000 ;                     U.CHAR(NUM+1) = "H")                              1  CHECK.EITH
2  0  00042100 ;     OR (U.CHAR(NUM-1) = "R" OR U.CHAR(NUM-1) = "C" OR                 1  CHECK.EITH
2  0  00042200 ;         U.CHAR(NUM-1) = "H") AND                                      1  CHECK.EITH
2  0  00042300 ;                 U.CHAR(NUM) = "K" AND                                 1  CHECK.EITH
2  0  00042400 ;                 U.CHAR(NUM+1) NEQ "N"                                 1  CHECK.EITH
2  0  00042500 ;     THEN RETURN 2;                                                    1  CHECK.EITH
2  1  00042600 ;%                                                                      1  CHECK.EITH
2  1  00042700 ;  IF    U.CHAR(NUM-1) = "N" AND                                        1  CHECK.EITH
2  0  00042800 ;            (U.CHAR(NUM) = "G" OR                                      1  CHECK.EITH
2  0  00042900 ;             U.CHAR(NUM) = "C") AND NOT                                1  CHECK.EITH
2  0  00043000 ;                    (U.CHAR(NUM+1) = "L" OR                            1  CHECK.EITH
2  0  00043100 ;                     U.CHAR(NUM+1) = "H")                              1  CHECK.EITH
2  0  00043200 ;     OR (U.CHAR(NUM-1) = "N" OR U.CHAR(NUM-1) = "R") AND               1  CHECK.EITH
2  0  00043300 ;                 U.CHAR(NUM) = "D"                                     1  CHECK.EITH
2  0  00043400 ;     OR (U.CHAR(NUM-1) = "C" OR U.CHAR(NUM-1) = "T" OR                 1  CHECK.EITH
2  0  00043500 ;         U.CHAR(NUM-1) = "P" OR U.CHAR(NUM-1) = "G") AND               1  CHECK.EITH
2  0  00043600 ;                 U.CHAR(NUM) = "H"                        %3/5%        1  CHECK.EITH
2  0  00043700 ;     OR (U.CHAR(NUM-1) = "P" OR                                        1  CHECK.EITH
```

```
2  0  00043800 :              U.CHAR(NUM-1) = "C" OR                                        :  CHECK,EITH
2  0  00043900 :              U.CHAR(NUM-1) = "N"), AND                                     :  CHECK,EITH
2  0  00044000 :                   U.CHAR(NUM) = "T" AND                                    :  CHECK,EITH
2  0  00044100 :                        U.CHAR(NUM+1) NEQ "H"                               :  CHECK,EITH
2  0  00044200 :      OR  U.CHAR(NUM-1) = "M" AND                                           :  CHECK,EITH
2  0  00044300 :                   U.CHAR(NUM) = "P" AND NOT                                :  CHECK,EITH
2  0  00044400 :                        (U.CHAR(NUM+1) = "T" OR                             :  CHECK,EITH
2  0  00044500 :                         U.CHAR(NUM+1) = "R" OR      %3/5%                  :  CHECK,EITH
2  0  00044600 :                         U.CHAR(NUM+1) = "L")                               :  CHECK,EITH
2  0  00044700 :      OR  U.CHAR(NUM-1) = "R" AND                                           :  CHECK,EITH
2  0  00044800 :                   U.CHAR(NUM) = "T" AND                                    :  CHECK,EITH
2  0  00044900 :                        U.CHAR(NUM+1) NEQ "H"                               :  CHECK,EITH
2  0  00045000 :      OR  U.CHAR(NUM-1) = "T" AND                                           :  CHECK,EITH
2  0  00045100 :                   U.CHAR(NUM) = "H"                                        :  CHECK,EITH
2  0  00045200 :      THEN RETURN 2;                                                        :  CHECK,EITH
2  1  00045300 :%                                                                           :  CHECK,EITH
2  1  00045400 :  IF   U.CHAR(NUM-1) NEQ "R" AND U.CHAR(NUM) = "R"                          :  CHECK,EITH
2  0  00045500 :      OR NOT                                                                :  CHECK,EITH
2  0  00045600 :           (U.CHAR(NUM-1) = "L" OR U.CHAR(NUM-1) = "B")     %3/5%           :  CHECK,EITH
2  0  00045700 :           AND U.CHAR(NUM) = "L"                                            :  CHECK,EITH
2  0  00045800 :      OR  U.CHAR(NUM-1) = "S" AND                                           :  CHECK,EITH
2  0  00045900 :           (U.CHAR(NUM) = "T" OR                                            :  CHECK,EITH
2  0  00046000 :            U.CHAR(NUM) = "C") AND                                          :  CHECK,EITH
2  0  00046100 :                U.CHAR(NUM+1) = "R"                                         :  CHECK,EITH
2  0  00046200 :      OR  U.CHAR(NUM) = "F" AND                                             :  CHECK,EITH
2  0  00046300 :                U.CHAR(NUM+1) = "L"                                         :  CHECK,EITH
2  0  00046400 :      THEN RETURN 1; ELSE                                                   :  CHECK,EITH
2  0  00046500 :      RETURN 0;                                                             :  CHECK,EITH
2  1  00046600 :END CHECK,EITHER;                                                           :  CHECK,EITH
1  0  00046700 :%                                                                           :
1  0  00046800 :HYP,CNT | 0;                                                                :
1  0  00046900 :DO FILL,MASK FOREVER;                                                       :
1  1  00047000 :  IF C,CHAR = "A" OR C,CHAR = "E" OR C,CHAR = "I" OR C,CHAR = "O"           :  HYPHENATE
1  1  00047100 :     OR C,CHAR = "U" OR C,CHAR = "Y" OR C,CHAR = #81# OR C,CHAR = #85#      :  HYPHENATE
1  1  00047200 :     OR C,CHAR = #89# OR C,CHAR = #96# OR C,CHAR = #A4#                     :  HYPHENATE
1  1  00047300 :     OR C,CHAR = #A8#                                                       :  HYPHENATE
1  1  00047400 :  THEN SUBBIT(MASK,HYP,CNT,1) | 0;                                          :  HYPHENATE
1  2  00047500 :  ELSE SUBBIT(MASK,HYP,CNT,1) | 1;                                          :  HYPHENATE
1  2  00047600 :  IF (BUMP HYP,CNT) = WRD,LGTH                                              :  HYPHENATE
1  1  00047700 :  THEN UNDO FILL,MASK;                                                      :  HYPHENATE
1  1  00047800 :END FILL,MASK;                                                              :  HYPHENATE
1  0  00047900 :DECREMENT HYP,CNT;                                                          :  HYPHENATE
1  0  00048000 :IF C,CHAR = "E" OR C,CHAR = #85#                                            :  HYPHENATE
1  0  00048100 :  THEN SUBBIT(MASK,HYP,CNT,1) | 1;                                          :  HYPHENATE
1  0  00048200 :COLS,LEFT | LINE,LGTH - LINE,COL - 1;                                       :  HYPHENATE
1  0  00048300 :IF COLS,LEFT GEQ 7                                                          :  HYPHENATE
1  0  00048400 :  THEN DO SPLIT,IT FOREVER;                                                 :  HYPHENATE
1  1  00048500 :     HYP,CNT | IF COLS,LEFT LSS 5                                           :  HYPHENATE
1  1  00048600 :                  THEN 0   ELSE COLS,LEFT - 5;                              :  HYPHENATE
1  1  00048700 :     CNTR | COLS,LEFT - HYP,CNT;                                            :  HYPHENATE
1  1  00048800 :     DO LOOP,SPECIAL FOREVER;                                               :  HYPHENATE
1  2  00048900 :        IF   SUBSTR(CARD,BUF,0,1) = "?"                                     :  HYPHENATE
1  2  00049000 :        THEN DO;                                                            :  HYPHENATE
1  3  00049100 :              SUBSTR(CARD,BUF,0,1) | " ";                                   :  HYPHENATE
1  3  00049200 :              ACTION | 6;                                                   :  HYPHENATE
1  3  00049300 :              WRD,LGTH | 0;                                                 :  HYPHENATE
1  3  00049400 :              UNDO SPLIT,IT;                                                :  HYPHENATE
1  3  00049500 :        END; ELSE                                                           :  HYPHENATE
1  2  00049600 :        IF   (SUBSTR (CARD,BUF,0,1) = "(" OR SUBSTR (CARD,BUF,0,1) = "*"    :  HYPHENATE
1  3  00049700 :        OR SUBSTR (CARD,BUF,0,1) = """"                                     :  HYPHENATE
1  3  00049800 :        OR SUBSTR (CARD,BUF,0,1) = "<" OR SUBSTR (CARD,BUF,0,1) = "#"       :
1  3  00049900 :        OR SUBSTR (CARD,BUF,0,1) = "I" OR SUBSTR (CARD,BUF,0,1) = #L#)      :  HYPHENATE
1  3  00050000 :        AND WRD,LGTH LSS 8                                                  :  HYPHENATE
1  3  00050100 :        THEN DO;                                                            :  HYPHENATE
1  4  00050200 :              ACTION | 6;                                                   :  HYPHENATE
1  4  00050300 :              WRD,LGTH | 0;                                                 :  HYPHENATE
1  4  00050400 :              UNDO SPLIT,IT;                                                :  HYPHENATE
1  4  00050500 :        END; ELSE                                                           :  HYPHENATE
1  3  00050600 :        IF S,CHAR = "-" OR S,CHAR = "/" OR S,CHAR = ","                     :  HYPHENATE
1  4  00050700 :        OR S,CHAR = "!"   OR S,CHAR = ";" OR S,CHAR = "%"                   :  HYPHENATE
1  4  00050800 :        OR S,CHAR = "&" OR S,CHAR = "!" OR S,CHAR = ")"                     :  HYPHENATE
1  4  00050900 :        OR S,CHAR = ">" OR S,CHAR = "]" OR S,CHAR = "+"                     :  HYPHENATE
1  4  00051000 :        THEN DO;                                                            :  HYPHENATE
1  5  00051100 :              BUMP CNTR;                                                    :  HYPHENATE
1  5  00051200 :              SUBSTR(LINE, LINE,COL, HYP,CNT + CNTR) |                      :  HYPHENATE
1  5  00051300 :                   SUBSTR(CARD,BUF,0,HYP,CNT + CNTR);                       :  HYPHENATE
1  5  00051400 :              WRD,LGTH | HYP,CNT + CNTR;                                    :  HYPHENATE
1  5  00051500 :              UNDO SPLIT,IT;                                                :  HYPHENATE
1  5  00051600 :        END;                                                                :  HYPHENATE
1  5  00051700 :        IF (DECREMENT CNTR) LSS 0                                           :  HYPHENATE
1  2  00051800 :        THEN UNDO LOOP,SPECIAL;                                             :  HYPHENATE
1  2  00051900 :     END LOOP,SPECIAL;                                                      :  HYPHENATE
1  1  00052000 :     CASE SUBBIT(MASK,HYP,CNT,5);              %9=2/27%                     :  HYPHENATE
1  2  00052100 :     ACTION |                           6;  %0%                             :  HYPHENATE
1  2  00052200 :     ACTION |                           4;  %1%                             :  HYPHENATE
1  2  00052300 :     ACTION | (IF CHECK,SINGLE (3) = 2 THEN 5 ELSE                          :  HYPHENATE
1  2  00052400 :                IF CHECK,SINGLE (3) = 1 THEN 4 ELSE 3));   %2%              :  HYPHENATE
1  2  00052500 :     ACTION | (IF CHECK,EITHER (4) = 1 THEN 3 ELSE                          :  HYPHENATE
1  2  00052600 :                IF CHECK,EITHER (4) = 2 THEN 5 ELSE                         :  HYPHENATE
1  2  00052700 :                IF CHECK,EITHER (4) = 3 THEN 6 ELSE 4));   %3%              :  HYPHENATE
1  2  00052800 :     ACTION | (IF CHECK,SINGLE (2) = 2 THEN 4 ELSE                          :  HYPHENATE
1  2  00052900 :                IF CHECK,SINGLE (2) = 1 THEN 3 ELSE 2));   %4%              :  HYPHENATE
1  2  00053000 :     ACTION | (IF CHECK,SINGLE (2) = 2 THEN 4 ELSE                          :  HYPHENATE
1  2  00053100 :                IF CHECK,SINGLE (2) = 1 THEN 3 ELSE 2));   %5%              :  HYPHENATE
1  2  00053200 :     ACTION | (IF CHECK,DOUBLE (3) = 1 THEN 2 ELSE                          :  HYPHENATE
1  2  00053300 :                IF CHECK,DOUBLE (3) = 2 THEN 4 ELSE 3));   %6%              :  HYPHENATE
1  2  00053400 :     ACTION | (IF CHECK,DOUBLE (3) = 1 THEN 2 ELSE                          :  HYPHENATE
1  2  00053500 :                IF CHECK,DOUBLE (3) = 2 THEN 4 ELSE 5));   %7%              :  HYPHENATE
1  2  00053600 :     ACTION | (IF CHECK,SINGLE (1) = 2 THEN 3 ELSE                          :  HYPHENATE
1  2  00053700 :                IF CHECK,SINGLE (1) = 1 THEN 2 ELSE 1));   %8%              :  HYPHENATE
1  2  00053800 :     ACTION | (IF CHECK,SINGLE (1) = 2 THEN 3 ELSE                          :  HYPHENATE
1  2  00053900 :                IF CHECK,SINGLE (1) = 1 THEN 2 ELSE 1));   %9%              :  HYPHENATE
1  2  00054000 :     ACTION | (IF CHECK,SINGLE (3) = 2 THEN 5 ELSE                          :  HYPHENATE
```

```
1  2  00054100 :              IF CHECK.SINGLE (3) = 1  THEN 4  ELSE 3));  %10%    ! HYPHENATE
1  2  000542U0 :      ACTION ! (IF CHECK.DOUBLE (4) = 1  THEN 3  ELSE                     ! HYPHENATE
1  2  000543U0 :              IF CHECK.DOUBLE (4) = 2  THEN 5  ELSE 4));  %11%    ! HYPHENATE
1  2  000544U0 :      ACTION ! (IF CHECK.DOUBLE (2) = 1  THEN 1  ELSE                     ! HYPHENATE
1  2  000545U0 :              IF CHECK.DOUBLE (2) = 2  THEN 3  ELSE 2));  %12%    ! HYPHENATE
1  2  000546U0 :      ACTION ! (IF CHECK.DOUBLE (2) = 1  THEN 1  ELSE                     ! HYPHENATE
1  2  000547U0 :              IF CHECK.DOUBLE (2) = 2  THEN 3  ELSE 2));  %13%    ! HYPHENATE
1  2  000548U0 :      ACTION ! (IF CHECK.TRIPLE (2) = 1  THEN 1  FLSE                     ! HYPHENATE
1  2  000549U0 :              IF CHECK.TRIPLE (2) = 2  THEN 3  ELSE                       ! HYPHENATE
1  2  000550U0 :              IF CHECK.TRIPLE (2) = 3  THEN 4  ELSE 2));  %14%    ! HYPHENATE
1  2  000551U0 :      ACTION ! (IF CHECK.QUAD   (2) = 1  THEN 1  ELSE          %3/25%    ! HYPHENATE
1  2  000552U0 :              IF CHECK.QUAD    (2) = 2  THEN 3  ELSE                      ! HYPHENATE
1  2  000553U0 :              IF CHECK.QUAD    (2) = 3  THEN 4  ELSE 2));  %15%    ! HYPHENATE
1  2  000554U0 :      ACTION !                                      3);  %16%    ! HYPHENATE
1  2  000555U0 :      ACTION ! (IF CHECK.SINGLE (4) = 2  THEN 6  ELSE                     ! HYPHENATE
1  2  000556U0 :              IF CHECK.SINGLE (4) = 1  THEN 5  ELSE 4));  %17%    ! HYPHENATE
1  2  000557U0 :      ACTION ! (IF CHECK.SINGLE (3) = 2  THEN 5  ELSE                     ! HYPHENATE
1  2  000558U0 :              IF CHECK.SINGLE (3) = 1  THEN 4  ELSE 3));  %18%    ! HYPHENATE
1  2  000559U0 :      ACTION ! (IF CHECK.EITHER (4) = 1  THEN 3  ELSE                     ! HYPHENATE
1  2  000560U0 :              IF CHECK.EITHER (4) = 2  THEN 5  ELSE                       ! HYPHENATE
1  2  000561U0 :              IF CHECK.EITHER (4) = 3  THEN 6  ELSE 4));  %19%    ! HYPHENATE
1  2  000562U0 :      ACTION ! (IF CHECK.SINGLE (2) = 2  THEN 4  ELSE                     ! HYPHENATE
1  2  000563U0 :              IF CHECK.SINGLE (2) = 1  THEN 3  ELSE 2));  %20%    ! HYPHENATE
1  2  000564U0 :      ACTION ! (IF CHECK.SINGLE (2) = 2  THEN 4  ELSE                     ! HYPHENATE
1  2  000565U0 :              IF CHECK.SINGLE (2) = 1  THEN 3  ELSE 2));  %21%    ! HYPHENATE
1  2  000566U0 :      ACTION ! (IF CHECK.DOUBLE (3) = 1  THEN 2  ELSE                     ! HYPHENATE
1  2  000567U0 :              IF CHECK.DOUBLE (3) = 2  THEN 4  ELSE 3));  %22%    ! HYPHENATE
1  2  000568U0 :      ACTION ! (IF CHECK.TRIPLE (3) = 1  THEN 2  ELSE                     ! HYPHENATE
1  2  000569U0 :              IF CHECK.TRIPLE (3) = 2  THEN 4  ELSE                       ! HYPHENATE
1  2  000570U0 :              IF CHECK.TRIPLE (3) = 3  THEN 5  ELSE 3));  %23%    ! HYPHENATE
1  2  000571U0 :      ACTION !                                      4);  %24%    ! HYPHENATE
1  2  000572U0 :      ACTION ! (IF CHECK.EITHER (1) = 1  THEN 0  ELSE                     ! HYPHENATE
1  2  000573U0 :              IF CHECK.EITHER (1) = 2  THEN 2  ELSE                       ! HYPHENATE
1  2  000574U0 :              IF CHECK.EITHER (1) = 3  THEN 3  ELSE 1));  %25%    ! HYPHENATE
1  2  000575U0 :      ACTION ! (IF CHECK.SINGLE (3) = 2  THEN 5  ELSE                     ! HYPHENATE
1  2  000576U0 :              IF CHECK.SINGLE (3) = 1  THEN 4  ELSE 3));  %26%    ! HYPHENATE
1  2  000577U0 :      ACTION ! (IF CHECK.EITHER (4) = 1  THEN 3  ELSE                     ! HYPHENATE
1  2  000578U0 :              IF CHECK.EITHER (4) = 2  THEN 5  ELSE                       ! HYPHENATE
1  2  000579U0 :              IF CHECK.EITHER (4) = 3  THEN 6  ELSE 4));  %27%    ! HYPHENATE
1  2  000580U0 :      ACTION ! (IF CHECK.TRIPLE (1) = 1  THEN 0  ELSE                     ! HYPHENATE
1  2  000581U0 :              IF CHECK.TRIPLE (1) = 2  THEN 2  ELSE                       ! HYPHENATE
1  2  000582U0 :              IF CHECK.TRIPLE (1) = 3  THEN 3  ELSE 1));  %28%    ! HYPHENATE
1  2  000583U0 :      ACTION ! (IF CHECK.TRIPLE (1) = 1  THEN 0  ELSE                     ! HYPHENATE
1  2  000584U0 :              IF CHECK.TRIPLE (1) = 2  THEN 2  ELSE                       ! HYPHENATE
1  2  000585U0 :              IF CHECK.TRIPLE (1) = 3  THEN 3  ELSE 1));  %29%    ! HYPHENATE
1  2  000586U0 :      ACTION ! (IF CHECK.QUAD   (1) = 1  THEN 0  ELSE          %2/25%    ! HYPHENATE
1  2  000587U0 :              IF CHECK.QUAD   (1) = 2  THEN 2  ELSE                       ! HYPHENATE
1  2  000588U0 :              IF CHECK.QUAD   (1) = 3  THEN 3  ELSE 1));  %30%    ! HYPHENATE
1  2  000589U0 :      ACTION !                                      6);  %31%    ! HYPHENATE
1  2  000590U0 :    END CASE;                                                             ! HYPHENATE
1  1  000591U0 :    IF (WRD.LGTH-(HYP.CNT + ACTION)) LSS 2 OR (HYP.CNT + ACTION) LSS 2     ! HYPHENATE
1  1  000592U0 :      THEN ACTION ! 6;                                                    ! HYPHENATE
1  2  000593U0 :    IF (HYP.CNT + ACTION) = 2 AND SUBBIT(MASK,0,2) = 3                     ! HYPHENATE
1  1  000594U0 :      THEN ACTION ! 6;                                                    ! HYPHENATE
1  2  000595U0 :    IF (WRD.LGTH - (HYP.CNT + ACTION)) = 2 AND                             ! HYPHENATE
1  1  000596U0 :        SUBBIT(MASK,WRD.LGTH - 2,2) = 3                                   ! HYPHENATE
1  1  000597U0 :      THEN ACTION ! 6;                                                    ! HYPHENATE
1  2  000598U0 :    IF (WRD.LGTH - (HYP.CNT + ACTION)) = 3 AND                             ! HYPHENATE
1  1  000599U0 :        SUBBIT(MASK,WRD.LGTH - 3,2) = 7                                   ! HYPHENATE
1  1  000600U0 :      THEN ACTION ! 6;                                                    ! HYPHENATE
1  2  000601U0 :    IF ACTION = 6 AND LINE.LGTH LSS WRD.LGTH                               ! HYPHENATE
1  1  000602U0 :      THEN IF COLS.LEFT = 7 AND WRD.LGTH GTR 7                             ! HYPHENATE
1  2  000603U0 :        THEN DO;                                                          ! HYPHENATE
1  3  000604U0 :          ACTION ! 5;                                                     ! HYPHENATE
1  3  000605U0 :          COLS.LEFT ! LINE.LGTH-LINE.COL-1;                               ! HYPHENATE
1  3  000606U0 :          HYP.CNT ! COLS.LEFT - 5;                                        ! HYPHENATE
1  3  000607U0 :          IF LINE.LGTH LSS 129                                            ! HYPHENATE
1  3  000608U0 :            THEN SUBSTR(LINE,LINE.LGTH+0,3) ! "***";                      ! HYPHENATE
1  4  000609U0 :          END;                                                            ! HYPHENATE
1  3  000610U0 :        ELSE UNDO SPLIT.IT;                                               ! HYPHENATE
1  3  000611U0 :    IF ACTION NEQ 6                                                       ! HYPHENATE
1  1  000612U0 :      THEN DO;                                                            ! HYPHENATE
1  2  000613U0 :        IF COLS.LEFT = 5 AND ACTION = 0                                   ! HYPHENATE
1  2  000614U0 :          THEN UNDO SPLIT.IT;                                             ! HYPHENATE
1  2  000615U0 :        SUBSTR(LINE,LINE.COL,HYP.CNT+ACTION+1) !                           ! HYPHENATE
1  2  000616U0 :          SUBSTR(CARD.BUF,0,HYP.CNT+ACTION) CAT "-";                      ! HYPHENATE
1  2  000617U0 :        WRD.LGTH ! HYP.CNT + ACTION;                                      ! HYPHENATE
1  2  000618U0 :        UNDO SPLIT.IT;                                                    ! HYPHENATE
1  2  000619U0 :      END;                                                                ! HYPHENATE
1  2  000620U0 :      DECREMENT COLS.LEFT;                                                ! HYPHENATE
1  1  000621U0 :    END SPLIT.IT;                                                         ! HYPHENATE
1  1  000622U0 :    ELSE ACTION ! 6;                                                      ! HYPHENATE
1  1  000623U0 :  IF LINE.LGTH LSS 129 AND ACTION NEQ 6                                    ! HYPHENATE
1  0  000624U0 :    THEN SUBSTR(LINE,LINE.LGTH,3) ! DECIMAL(SUBBIT(MASK,HYP.CNT,5),2);     ! HYPHENATE
1  1  000625U0 :  WRITE.LINE;                                                             ! HYPHENATE
1  0  000626U0 :  IF ACTION = 6                                                           ! HYPHENATE
1  0  000627U0 :    THEN WRD.LGTH ! 0;                                                    ! HYPHENATE
1  1  000628U0 :  END HYPHENATE;                                                          ! HYPHENATE
0  0  000629U0 :%
0  0  000630U0 :%
0  0  000631U0 :%
0  0  000632U0 :PROCEDURE SCAN;
0  0  000633U0 :  DECLARE COL.CNT       BIT(24);                                          ! SCAN
1  0  000634U0 :  IF WRD.LGTH NEQ 0                                                        ! SCAN
0  0  000635U0 :    THEN CARD.BUF ! SUBSTR(CARD.BUF,WRD.LGTH);                             ! SCAN
1  1  000636U0 :  WRD.LGTH ! COL.CNT ! 0;                                                  ! SCAN
1  0  000637U0 :  IF CARD.BUF = " "                                                        ! SCAN
0  0  000638U0 :    THEN RETURN;                                                          ! SCAN
1  1  000639U0 :  DO PRE.BLANKS FOREVER;                                                   ! SCAN
1  1  000640U0 :    IF SUBSTR(CARD.BUF,COL.CNT,1) NEQ " "                                  ! SCAN
1  1  000641U0 :      THEN UNDO PRE.BLANKS;                                                ! SCAN
1  1  000642U0 :    BUMP COL.CNT;                                                         ! SCAN
1  1  000643U0 :  END PRE.BLANKS;                                                         ! SCAN
```

It is to be understood that the above described implementations of the invention are merely illustrative and that many modifications and variations are possible without departing from the true spirit of the invention. Accordingly, the invention is to be considered as including all possible modifications and variations coming within the scope of the appended claims.

What is claimed is:

1. In apparatus for displaying words in lines on a display device, hyphenating control means for automatically controlling the hyphenating of words which will only partially fit at the end of a line, said hyphenating control means comprising:

means responsive to the length of an input word and to the number of spaces remaining on a line for detecting the presence of a hyphenate situation with respect to said input word;

means responsive to the detection of a hyphenate situation with respect to an input word for digitizing a predetermined portion thereof such that each consonant is represented by one binary value and each vowel is represented by the other binary value, said predetermined portion comprising a consecutive group containing the last characters of the input word which will fit on the line;

a memory storing a table of consonant-vowel bit value patterns representing the possible patterns obtainable as a result of digitizing said group, said memory additionally storing an individually selectable hyphenation indication for each pattern of said table indicating how a word which produces the pattern should be hyphenated; and means for comparing the consonant-vowel bit value pattern derived from an input word to be hyphenated with the patterns in said table and providing output hyphenation data based on the stored hyphenation indication corresponding to the pattern for which a match is obtained.

2. The invention in accordance with claim 1, wherein said group contains five characters so that digitizing results in providing a consonant-vowel pattern having five digits.

3. The invention in accordance with claim 2, wherein thirty-two consonant-vowel patterns are provided in said table for comparison with the five digit consonant-vowel pattern provided for an input word to be hyphenated.

4. The invention in accordance with claim 1, including:

means responsive to the particular characters between which hyphenation is indicated by said means for comparing for detecting an exception situation; and means for generating modified hyphenation data if an exception situation is detected.

5. The invention in accordance with claim 1, including:

means responsive to particular letters of an input word for preventing hyphenation for situations where hyphenation is not desirable.

6. In apparatus for displaying words in lines on a display device, an automatically performable, electronically implemented method for controlling the hyphenating of words which will only partially fit at the end of a line, said method comprising the steps of:
- detecting the presence of a hyphenate situation in response to the length of an input word and the number of spaces remaining on a line;
- digitizing a predetermined portion of an input word in response to said detecting of a hyphenate situation with respect thereto such that each consonant is represented by one binary value and each vowel is represented by the other binary value, said predetermined portion comprising a consecutive group containing the last characters of the input word which will fit on the line;
- comparing the consonant-vowel pattern derived from said digitizing with a table of consonant-vowel bit value patterns representing the possible patterns obtainable as a result of said digitizing, each pattern of said table additionally including an accompanying individually selectable indication of the location of a hyphen with respect to the bits thereof; and
- generating a hyphenation indication for an input word to be hyphenated based on the pattern in said table for which said comparing produces a match and the indicated location of the hyphen accompanying the pattern providing the match.

7. The invention in accordance with claim 6, wherein said group contains five characters so that digitizing results in providing a consonant-vowel pattern having five digits.

8. The invention in accordance with claim 7, wherein thirty-two consonant-vowel patterns are provided in said table for comparison with the five digit consonant-vowel pattern provided for an input word to be hyphenated.

9. The invention in accordance with claim 6, including:
- detecting whether an exception situation exists with respect to an input word being hyphenated in response to the hyphenation indication provided by said generating and the values of the characters between which hyphenation is indicated; and
- generating a modified hyphenation indication if an exception is detected.

* * * * *